United States Patent [19]

McDonald et al.

[11] Patent Number: 4,529,489
[45] Date of Patent: Jul. 16, 1985

[54] LASER PHOTOCHEMICAL DECOMPOSITION OF COMPOUNDS CONTAINING R—O—P MOIETY (CHEMICAL AGENTS)

[75] Inventors: Joseph K. McDonald, Athens, Ala.; James A. Merritt, Pulaski, Tenn.; Ann E. Stanley, Huntsville, Ala.

[73] Assignee: The United States of America as represented by the Secretary of the Army, Washington, D.C.

[21] Appl. No.: 588,489

[22] Filed: Mar. 12, 1984

[51] Int. Cl.$^3$ .............................. B01J 19/12
[52] U.S. Cl. .................. 204/158 R; 210/748; 422/22
[58] Field of Search ............ 204/158 P, 158 R; 210/748; 422/22

[56] References Cited

U.S. PATENT DOCUMENTS 4,124,466 11/1978 Morrey ...................... 204/158 R
4,303,483 12/1981 Ham et al. .................. 204/157.1 R Primary Examiner—Howard S. Williams
Attorney, Agent, or Firm—Anthony T. Lane; Robert P. Gibson; Jack W. Voigt

[57] ABSTRACT

A CW tunable laser is employed in a laser photochemical decomposition method to achieve decomposition of a compound of high toxicity to relatively non-toxic decomposition products.

Organophosphorus chemical agents containing a characteristic C—O—P group are irradiated with a predetermined power level from about 10 to about 150 W/cm$^2$ for a predetermined time period to effect cleavage of the C—O bond. The infrared laser excitation level of radiation in the range of 10.4 μm or 9.4 μm is resonant with the absorption band of the C—O—P group contained in the organophosphorus chemical agent. The absorbed radiation effects cleavage of the C—O bond and thereby achieves decomposition of the organophosphorus chemical agent.

The disclosed method is highly selective for cleavage of the C—O bond rather then cleavage of the P—O bond, and in the presence of air, the method requires low power levels of the CO$_2$ laser for rapid and complete dissociation of the organophosphorus chemical agent.

5 Claims, 6 Drawing Figures

LASER PHOTOCHEMICAL DECOMPOSITION OF COMPOUNDS CONTAINING R—O—P MOIETY (CHEMICAL AGENTS)

DEDICATORY CLAUSE

The invention described herein may be manufactured, used, and licensed by or for the Government for governmental purposes without the payment to us of any royalties thereon.

BACKGROUND OF THE INVENTION

The recent widespread availability of tunable lasers has enhanced the interest in photochemical processes. The output of a carbon dioxide ($CO_2$) infrared laser is resonant with the absorptions of a wide range of organic molecules, and because of this resonance, this type of gas laser has become the most popular for studies of infrared laser-induced chemical processes. The absorption of the laser radiation by the molecules promotes the molecules into excited vibrational states, and the molecules can become very reactive as a result.

In principle, the energy of the laser can be deposited into a single vibrational mode and the vibration can be excited to the point of dissociation. The resulting reactive species would be expected to react further. Such a process is referred to as a "mode-selective" laser-induced reaction. A mode-selective reaction requires that there be multiple photons deposited into the appropriate vibration over a short enough period of time so that the reaction can proceed before there is significant vibrational relaxation. This period of time is indeed short since energy relaxation within a given vibrational mode generally occurs on a time scale of picoseconds. For complex molecules there is also a redistribution of energy among different vibrational modes and rotational and translational levels. Furthermore, at pressures of a few torr and higher, intermolecular redistribution accompanies collisions. Consequently, it has been concluded that only a few microseconds are required for a molecule (which has been excited by an infrared laser) to reach a thermal equilibrium. Once the energy of the laser has been distributed throughout the molecule, any reaction which proceeds would very likely be similar to an ordinary pyrolysis reaction.

Even if the ultimate reactions are governed by thermal (or non-equilibrium thermal) processes, the laser-induced reactions will generally differ from ordinary pyrolytic thermal reactions because wall reactions are essentially eliminated from the former.

As noted hereinabove laser energy has been deposited to achieve a level of excitation to the point of dissociation of molecules to give reactive species. In experiments the laser energy has been distributed throughout the molecules to proceed along a reaction mode which is somewhat similar to an ordinary pyrolysis reaction.

This background information presented hereinabove hopefully provides the transitional language which focuses attention to another area to which laser-induced-chemistry has been found to be useful—not for producing a recoverable product formed from reactive species, but to the contrary, employing laser-induced-chemistry to achieve a means for eliminating toxic compounds from contaminated equipment or environment. The energetic species from a toxic compound could, for example, rearrange or react to form non-toxic species.

Of particular interest is a class of chemical agents known as nerve agents which constitute the most deadly toxins known to man. A slight exposure of some of these agents is sufficient to kill, with lethal doses as low as $LD_{50} = 10$ $\mu g/kg$. Further these nerve agents are extremely rapid in action. These two qualities of nerve agents make counteraction (detoxification) of these agents a particularly difficult problem. Decontamination is sometimes effected with alkaline solutions or bleach slurries which hydrolyze or otherwise chemically react with the agents. One is left with a noxious mixture to dissipate while the surface which has been decontaminated may have been damaged.

Since the chemical structures of some of the nerve agents contain an R—O—P linkage or specifically a C—O—P linkage, this linkage is of specific interest to this invention since the present invention relates to the decomposition of specific types of organophosphorus molecules containing the R—O—P linkage. A simple, efficient technique for decomposing (detoxifying) these molecules to relatively harmless compounds would be of tremendous value in decreased clean-up operations required for decontaminating equipment and environment. The problems of cleaning up equipment with corrosive chemicals increases hazards and primary costs as well as secondary costs, attributed to additional restorations required such as re-painting external surfaces of equipment, missiles, and fixtures would be obviated by the technique of this invention.

An object of this invention is to provide a laser photochemical method to effect decomposition of organophosphorus compounds containing the R—O—P moiety to thereby change these compounds to relatively harmless compounds.

A further object of this invention is to provide an efficient technique of detoxifying organophosphorus compounds wherein a continuous-wave, carbon dioxide laser is employed to decompose these compounds at a rate which is proportional to the level of the laser power employed.

Still a further object of this invention is to provide a laser photochemical method which serves as an efficient technique for detoxifying chemical agents containing the R—O—P linkage wherein as a result of lasers irradiation, the energy distibution cleaves a carbon-to-oxygen bond to yield relatively harmless compounds comprised of various alkanes and alkenes, and carbon dioxide as volatile products and a nonvolatile mixture of phosphates, phosphites, and polymeric phosphorus—containing compounds.

SUMMARY OF THE INVENTION

A method for $CO_2$ laser-induced decomposition of organophosphorus molecules with R—O—P linkage serves to detoxify a class of chemical agents rapidly and efficiently. The laser-induced method obviates the need of using presently corrosive and/or toxic solutions to decontaminate materials exposed to chemicals containing the R—O—P linkage such as contained in nerve agents.

The R—O—P moiety is a very strong absorber of the $CO_2$ laser. After sufficient energy absorption, which is as low as a 10 $W/cm^2$, the R—O bond is preferentially disassociated.

A representative R—O—P containing compound, gaseous trimethyl phosphite, was irradiated in one experiment for 20 seconds with 25 $W/cm^2$ from the $CO_2$ CW laser to verify the cleaving of C—O bonds while leaving the P—O bond intact as verified by experimental data. Irradiations are generally performed at room temperature for trimethyl phosphite, triethyl phosphite, and the tri-isopropyl phosphite; however, in an attempt to increase vapor pressure of some samples, and thereby improve the observable infrared spectrum of starting material and the end products, the samples of tri-isopropyl, tri-n-butyl, and tri-isobutyl phosphite were warmed to about 55° C. and irradiated as described.

DESCRIPTION OF THE PREFERRED EMBODIMENTS

Figure 1:
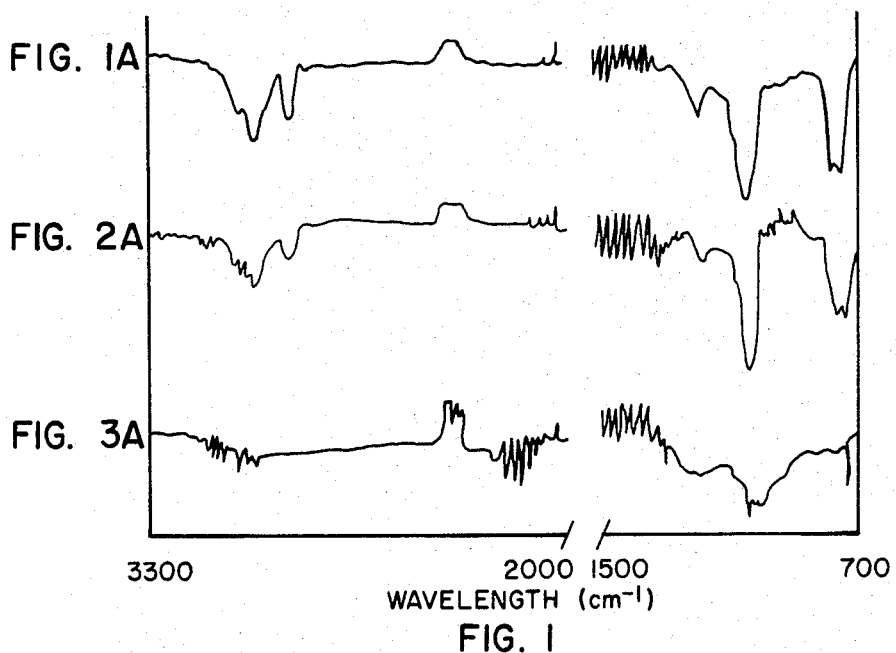
FIG. 1 depicts infrared spectra of trimethyl phosphite at FIGS. 1A, 2A and 3A, before and after irradiation with a $CO_2$ laser.

Laser induced chemistry is employed to decompose a class of compounds selected as "model" chemical agents for experimental studies representative of nerve agents. The initial investigations verified the experimental feasibility of decomposing a trialkyl phosphite by irradiating this type compound with a continuous wave carbon dioxide ($CO_2$) infrared laser.

The chemical structures of some of the nerve agents are shown under Example I below, wherein a characteristic P—O—C linkage is boxed in for compounds I, II, III, and IV which are further identified by structures and names. The alkyl phosphite which is decomposed as a result of cleavage of C—O serves to verify the concept of this invention since the nerve agent contains the same C—O—P linkage.

EXAMPLE I

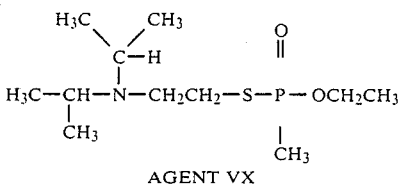

COMPOUND I

AGENT GA (TABUN)

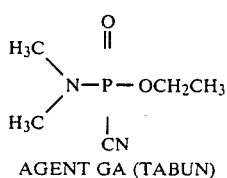

COMPOUND II

AGENT GB (SARIN)

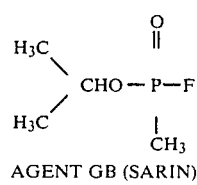

COMPOUND III

AGENT GD (SOMAN)

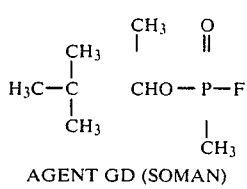

COMPOUND IV

AGENT VX

The infrared spectra of compounds containing the C—O—P moiety always contain an intense infrared absorption band in the region of 1000 $cm^{-1}$. This is a frequency region which is easily attainable by the output of a carbon dioxide ($CO_2$) infrared laser. In principle, the ($CO_2$) laser could be tuned to the frequency of the absorption band due to the C—O—P moiety and the molecule would then absorb the radiation from the laser. If sufficient absorption occurs, dissociation of the molecule can occur. The resulting energetic species would then rearrange or react with another species.

In light of the theoretical feasibility of laser-induced dissociation of nerve agents, a class of compounds are selected as "model" chemical agents for experimental studies. As an initial investigation into the experimental feasibility of this process the trialkyl phosphites are selected for study. These are triester compounds of the general formula $(RO)_3 P$ and thus contain three R—O linkages to each phosphorus atom. The specific compounds studied are those wherein $R=CH_3$—(methyl), $CH_3$—$CH_2$—(ethyl), $(CH_3)_2CH$—(isopropyl), $CH_3(CH_2)_3$—(n-butyl), and $(CH_3)_2$ —(isobutyl). This series represents a molecular weight range from 124 for the tri-methyl compound to 250 for the tri-n-butyl compound and a range of vibrational degrees of freedom from 10 to 37, respectively. This is a respectable range of comparison for the nerve agents depicted in Example I with only agent VX being considerably larger. Further, the fact that data on the thermal stability, photochemical reactions, and photo-induced oxidation of these compounds is available in the literature for comparison to the laser-induced process is an asset. Also available is the thermochemical data for some of the compounds. The presence of all this information in the literature will allow not only comparison to the observed results from the laser-induced processes but also possibly add insight into the mechanisms of laser-induced chemistry, an area where research, particularly with respect to theoretical models is still in its infancy. This is particularly significant if one is to successfully predict and control the dissociation of the nerve agents.

EXPERIMENTAL

The gas phase reactions are carried out in stainless steel cells (5×10 cm) equipped with O-ring seals for securing windows (5 cm diameter) onto the cells. The infrared laser beam enters through ZnSe windows at either end of the cell (traversing a 10 cm path). Potassium chloride windows are used on the short pathlength (5 cm) for recording the infrared spectra. Liquid phase reactions are carried out by substituting a metal plate for one of the ZnSe windows and dropping the liquid into a cavity which is centered on the metal plate. Irradiations then are directed through the remaining ZnSe window.

Figure 3:
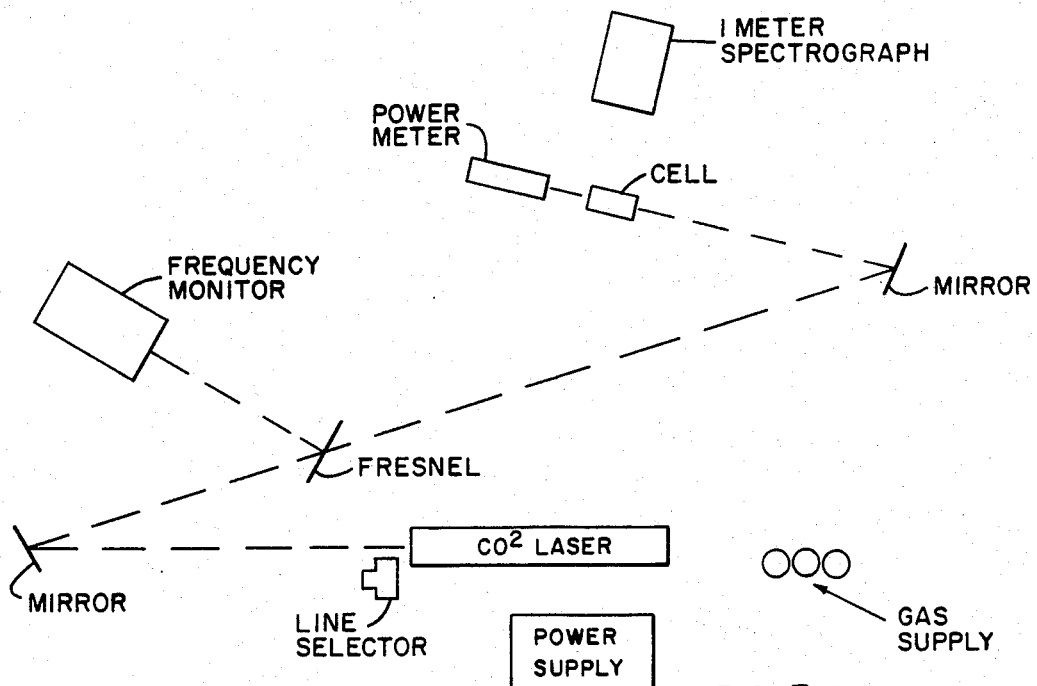
FIG. 3 of the drawing is a schematic illustration of the $CO_2$ laser arrangement for irradiating (in a cell) a composition to be decomposed.

Infrared laser excitation in the range of 10.4 or 9.4 μm is provided by a Coherent Radiation Laboratories model 41 continuous-wave $CO_2$ laser. The exact laser frequencies are verified using an Optical Engineering CO spectrum analyzer. In single-line operation, output powers between 50 and 150 $W/cm^2$ are obtained by variation of the $CO_2$—$N_2$—He gas mixture in the laser. The beam size is measured from burn patterns and is found to be approximately circular with a 4 mm diameter. The ZnSe window on the sample cell is found to transmit only 64% of the incident infrared radiation, so a measure of the laser power available to the samples must be adjusted accordingly. A block diagram of a typical orientation of the $CO_2$ laser and accessories is depicted in FIG. 3.

Irradiations are performed at room temperature for the trimethyl phosphite and the triethyl phosphite and the tri-isopropyl phosphite. In an attempt to increase vapor pressure of some samples, and thereby improve the observable infrared spectrum of the starting material and the end products, the samples of tri-isopropyl, tri-n-butyl and tri-isobutyl phosphite are warmed to about 55° C. and irradiated as previously described.

Infrared spectra of trimethyl phosphite are collected on a Digilab FTS-20B interferometer equipped with a KBr/Ge beamsplitter and a triglycine sulfate (TGS) detector. Interferograms were transformed after applying a trapezodial apodization function with an effective spectral resolution of 1.0 $cm^{-1}$. Infrared spectra of the remaining compounds are recorded on a Mattson Model IR-10000 interferometer equipped with a water cooled carborundum source, iris aperture, KBr beamsplitter, TGS detector and interferograms are transformed after applying a triangular apodization function with an effective spectral resolution of 1.0 cm. This resolution is sufficient to allow unequivocal identification of all the gaseous products as well as monitor the decrease of the starting material from its infrared absorption bands.

REACTION AND PROPERTIES OF PHOSPHITES

The nerve agents contain the R—O—P linkage and the ability to effect the decomposition of these species by a rapid and simple method is especially important. In addition, a knowledge of the mechanism of the decomposition would make it possible to ensure that the ultimate decomposition product will be relatively non-toxic materials.

The triesters of phosphorous, also containing the R—O—P linkage, are stable at room temperature. They are similar to esters of organic acids in that they can be distilled at reduced pressures without much decomposition. At 150° C. for 24 hours, some thermal decomposition will occur giving R—OH and unsaturated products.

EXAMPLE II

Gaseous trimethyl phosphite was irradiated for 20 seconds with 25 $W/cm^2$ from the $CO_2$ CW laser. The decomposition proceeds through the cleaving of R—O bonds. The absence of oxygen-containing hydrocarbons is evidence that P—O bonds are not being broken. FIG. 1 shows the spectra of trimethyl phosphite before decomposition and at various levels of decomposition, see FIG. 1A, FIG. 2B and FIG. 3A.

The spectrum of the pure sample in FIG. 1A illustrates the strong absorbence of the C—O stretching vibration at 1032 $cm^{-1}$, resonant with the $CO_2$ laser frequency. The spectrum in FIG. 2A after radiation shows a decrease in the amount of trimethyl phosphite and the appearance of the decomposition products (see Table 1).

TABLE 1

Products of the Decomposition of Pure $(CH_3O)_3P$ from Laser Radiation.

| Material | Products |
|---|---|
| $(CH_3O)_3P$ | $CH_4$, $C_2H_6$, phosphites, phosphates and polymeric phosphorous compounds as solids and liquids on the wall of the cell. |
| $(CH_3O)_3P + O_2$ (air) | $CH_4$, $CH_3OH$, $C_2H_6$, $C_2H_5OH$, solids and liquids. |

Figure 2:
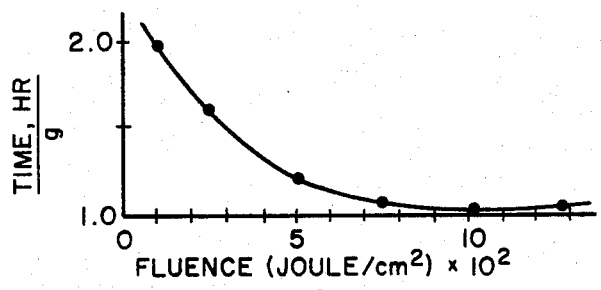
FIG. 2 illustrates the plotting of the depletion rate of pure trimethyl phosphite versus the fluence of the laser radiation.

The effect of the addition of oxygen to the pure sample of trimethyl phosphite in a one-to-one molar ratio and then radiation with the laser (25 $W/cm^2$ for 0.2 sec) is shown in FIG. 3A where the trimethyl phosphite is completely decomposed and now the additional product of methanol is observed. In FIG. 2 depletion rate of pure trimethyl phosphite is plotted versus the fluence of the laser radiation. The optimum is 1.1 hr/g at 600 joule/$cm^2$ for the depletion of the pure trimethyl phospite (see Table 2).

TABLE 2

| The Decomposition of Trimethyl Phosphite | | |
|---|---|---|
| Material | Time | Fluence |
| Pure Trimethyl Phosphite | 1.1 hr/g | 600 joule/$cm^2$ |
| Trimethyl Phosphite + $O_2$ (air) in a 1:1 molar ratio | 7.1 sec/g | 0.6367 joule/$cm^2$ |

However, when oxygen, in the form of air, is added before irradiation, the acceleration of the depletion time is significant.

To demonstrate that the cleaving of the C—O bond is the primary path of dissociation of this class of molecules, several of the higher hydrocarbon phosphites (triethyl phosphite, tri-isopropyl phosphite, tri-n-butyl phosphite) were subjected to $CO_2$ radiation. In every case no alcohols were observed; only hydrocarbons, solids and liquid phosphites and phosphates were present.

CONCLUSIONS

It can be appreciated by one skilled in the art that the method of this invention obviates the need to employ corrosive and/or toxic solutions to decontaminate materials contaminated with a highly toxic organophosphorus chemical agent. Making materials inert to these decontaminating solutions is very costly. This is not a requirement of the method of this invention since the irradiation method removes the toxic organophosphorus chemical agent without harming the substrate which it formerly contaminated.

A question here is whether the cleavage of the C—O bond results from mode-specific photochemistry (since the C—O bond stretch is being irradiated) or whether it is governed by the thermodynamics of the system. Since the C—O and P—O bonds have similar dissociation energies, it is probably the thermodynamic stability of the products which control the reactions.

In principle, a thermal mechanism should be independent of excitation frequency (as long as some species in the system absorbs the radiation). However, the products are not the same as those obtained from normal pyrolysis (alcohols are part of the products from pyrolysis indicating a breaking of the P—O bond also). Whatever the mechanism, the laser-induced chemistry technique has the potential to selectively break the C—O bond in compounds containing the R—O—P moiety.

This ability has great potential use in the decontamination process, especially for "soft" targets. A 10 W/cm² laser can decompose the R—O—P linkage in less than one second. Electronics can be "hardened" against such a CO₂ laser; thus a potential method to decontaminate them and other "soft" targets as well.

The teachings and data presented herein should provide a base for further promoting additional investigations in the field of decontamination of chemical agents.

We claim:

1. A method for laser photochemical decomposition of an organophosphorus chemical agent containing a C—O—P group as an integral part of said organophosphorus chemical agent, said method comprising:
   (i) positioning said organophosphorus chemical agent within infrared laser excitation in the range of 10.4 μm or 9.4 μm;
   (ii) irradiating said organophosphorus chemical agent with a predetermined power level from about 10 to about 150 W/cm² of a CW CO₂ tunable laser, tuned to a radiation line that is resonant with the absorption band of the C—O bond in said C—O—P group, for sufficient time to effect cleavage of said C—O bond and decomposition of said organophosphorus chemical agent.

2. The method of claim 1 wherein said organophosphorus chemical agent is selected from the group consisting of

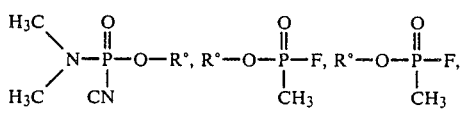

-continued

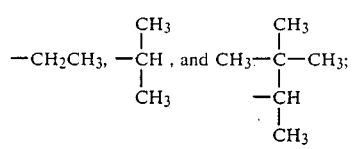

R° is selected from

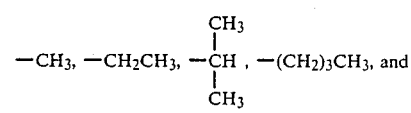

wherein R' is selected from $-CH_3, -CH_2CH_3, -\underset{\underset{CH_3}{|}}{\overset{\overset{CH_3}{|}}{CH}}, -(CH_2)_3CH_3,$ and $-CH_2-CH-(CH_3)_2;$ wherein said R°—O—P is an integral part of each of said organo-phosphorus chemical agents which are known nerve agents having chemical structures as shown; and wherein said (R'O)₃P contains three C—O linkages attached to each phosphorus atom with single bonds, said (R'O)₃P being trialkyl phosphites.

3. The method of claim 2 wherein said irradiating is achieved in the presence of added oxygen.

4. The method of claim 2 wherein said (R'O)₃P is (CH₃O)₃ P, and wherein said decomposition is achieved with an optimum fluence of laser radiation of 600 joules/cm² at a decomposition rate of 1.1 hours per gram.

5. The method of claim 4 wherein said (R'O)₃P is (CH₃O)₃P, and wherein said irradiating is achieved in the presence of oxygen in the form of air in a 1:1 molar ratio, and wherein said decomposition is achieved with an optimum fluence of laser radiation of 0.6367 joule/cm² at a decomposition rate of 7.1 seconds per gram.

* * * * *